(12) United States Patent
Jones et al.

(10) Patent No.: US 8,108,835 B2
(45) Date of Patent: Jan. 31, 2012

(54) METHOD AND SYSTEM FOR ENFORCING VERSION CONTROL

(75) Inventors: Nicholas Howard Jones, Romsey (GB); Jonathan Paul Kneller, Eastleigh (GB); Mark Brian Thomas, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1388 days.

(21) Appl. No.: 11/549,082

(22) Filed: Oct. 12, 2006

(65) Prior Publication Data

US 2008/0127075 A1 May 29, 2008

(30) Foreign Application Priority Data

Nov. 24, 2005 (GB) .................................... 0523888.6

(51) Int. Cl.
*G06F 9/45* (2006.01)
(52) U.S. Cl. ....................................................... 717/120

(58) Field of Classification Search .................. 717/120
See application file for complete search history.

(56) References Cited

U.S. PATENT DOCUMENTS

| | | | |
|---|---|---|---|
| 5,574,898 A | 11/1996 | Leblang et al. | 395/601 |
| 5,649,200 A | 7/1997 | Leblang et al. | 395/703 |
| 6,748,554 B2* | 6/2004 | Jin et al. | 714/15 |
| 7,634,757 B2* | 12/2009 | de Groot et al. | 717/122 |

* cited by examiner

*Primary Examiner* — John Chavis
(74) *Attorney, Agent, or Firm* — Zilka-Kotab, PC

(57) ABSTRACT

A method and system for enforcing version control is provided. An embodiment of the method comprises receiving a command to execute code. Code is retrieved from a code management storage and loaded into a controlled storage. The code may comprise test and program components. The code is executed and the results of the executed code are recorded and logged, and the code is removed from the controlled storage. The system includes an interface for receiving the execute code command and is coupled to the controlled storage. A code loader for loading code into the controlled storage may also be provided.

19 Claims, 2 Drawing Sheets

METHOD AND SYSTEM FOR ENFORCING VERSION CONTROL

RELATED APPLICATIONS

This application claims priority to Great Britain Appl. No. 0523888.6, filed Nov. 24, 2005.

BACKGROUND OF THE INVENTION

1. Field of the Invention

The invention relates to a method and apparatus for enforcing version control, and more particularly, to a method and apparatus for enforcing version control in a shell environment.

2. Background Information

In any sizeable software development project, maintaining code version integrity is essential for the smooth running of the project. To this end, it is accepted practice to use version control software, such as Concurrent Versioning System (CVS) or Configuration Management and Version Control (CMVC). However, a project will only progress smoothly if the rules of the version control software are followed by developers. The best controls, however well thought out, provide no benefit if not enforced.

In a worst case, poor version control discipline may lead to lost work. If a careless software programmer makes a change to the local copy of a file and does not check the updated code into the version control system, the changes may not be recorded and the work can be lost. It is difficult to determine what code was run on a given system at a given point in the past because of lost work. One could query the version control system and determine the recorded level of code for that time, but there is no assurance that the code actually used had not been edited locally.

U.S. Pat. No. 5,649,200, to Leblang et al., discloses a dynamic rule based version control system. Disclosed therein, provisions are made for access to the files for development purposes. Those provisions include, checking out the files, making local modifications, and checking them back in. The requirements of a formal testing process are not considered. The focus of the publication is the method of specification of the versions of the files which are wanted.

U.S. Pat. No. 5,574,898, to Leblang et al., discloses a dynamic software version auditor that provides a means of recording which versions of files are initially extracted in a process. It is designed for build environments where a list of the build files is required,

SUMMARY OF THE INVENTION

The present invention provides a method and system for enforcing version control. The system of the invention comprises a code management system for controlling code. The system may include an interface for receiving an execute code command. The command may be generated by a user. A controlled storage may be provided for temporarily storing code and may be coupled to the interface.

The system may further include a code loader coupled to the controlled storage and to a processor. The code loader loads code into the controlled storage and the processor executes the code, once it is loaded into the controlled storage. The system may also be provided with a logger for logging results of the code. A garbage collector may be provided for removing the code from the controlled storage while leaving the logged results.

The code may comprise test components and program components. The invention provides a shell environment that combines retrieving and executing steps under a single version control shell. The version control shell environment may assure the state of a system at any given time and may provide a tool to recreate the state of the system for any point in time.

A version control extension is added to a standard shell while the appearance and behavior of the standard shell remains unchanged. When a command is entered using the standard shell, the path is searched and the first occurrence of that command is executed. When a command is entered using the version control shell, the appropriate version of the package containing the command is first extracted from the code management system and loaded into the controlled storage, from where it is executed. The result is that while using the controlled storage, there is no longer the concept of a local version of an application. All commands executed, whether they are scripts, binary applications, or invocations of other shells, are those extracted from the code management system to the controlled storage.

Therefore, a benefit of the invention is that since the extracted files persist only for the lifetime of the specific invocation of the version controlled shell, official changes must be made through the code management system. Another benefit of the invention is that the state of the code management system may be recreated for any point the past, allowing past tests to be rerun or problems to be recreated.

One problem common to prior art controlled storage is that code must be continuously replaced because the prior art version controlled shell removes it after execution. This could result in code being executed multiple times from the same location. In the invention, code is loaded into the controlled storage each time before execution. To inhibit code loading from increasing overall test time, the code loader pre-loads all linked components from the code management on execution of the code.

Additionally, to improve code test times, the invention includes a recorder. The recorder records a list of components associated with a test program and stores the list for use in retrieving the linked components on subsequent executions of the test program. The recorded list of components may be user specific and may be extracted from the version control system when the shell is invoked.

An embodiment of the invented method comprises first receiving a command to execute code from a user. Code is then retrieved from code management storage and loaded into the controlled storage. The processor then executes the code in the controlled storage. The results of the executing code are then recorded. The logger then logs results of the code in a log file, while garbage collector removes the code from the controlled storage while leaving the results in the log file.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

An embodiment of the present invention provides a method and system for enforcing version control. The system of the invention comprises a code management system for controlling code.

Figure 1:
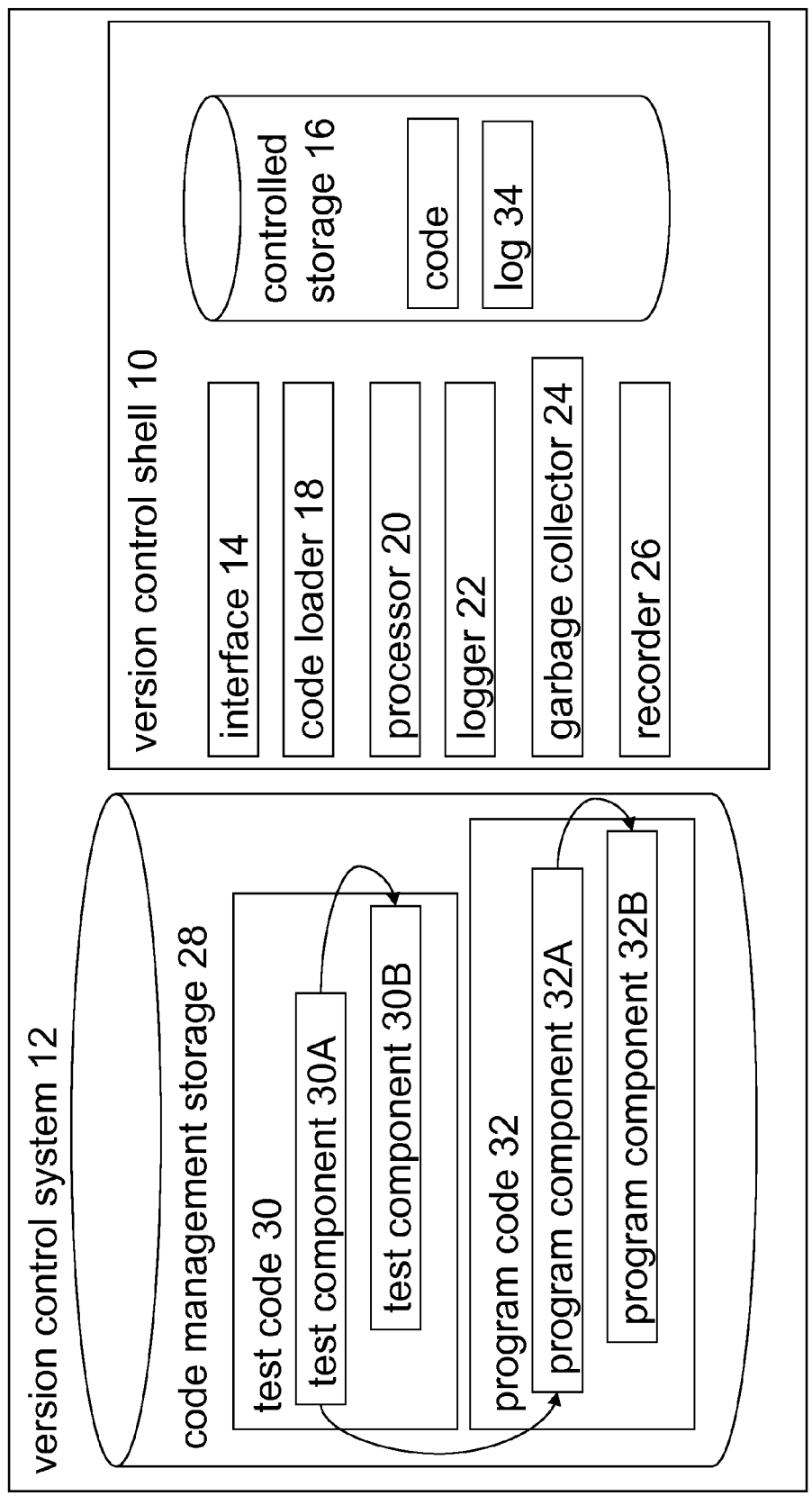
FIG. 1 is a schematic of a system according to the preferred embodiment.

Referring to FIG. 1 of the drawings, there is shown an embodiment of the invented system that may include a version control shell 10 for controlling code in a version control system 12.

An embodiment of the version control system 12 includes a code management storage 28. The version control system 12 controls versions of code that are accessed from the code management storage 28. The code stored in the code management storage 28 may comprise both test code 30 and program code 32.

The test code 30 may include a first test component 30A that may link to at least one other test component 30B. One of the test components 30A, 30B may comprise a command to execute the program code 32. The program code 32 comprises a first program component 32A that may link to at least one other program component 32B.

The version control shell 10 may include an interface 14 for generating a command to execute code. The command to execute code may be received from a user or may comprise a command embedded in test code 30 or program code 32.

The interface 14 may be coupled to a temporary controlled storage 16. The temporary controlled storage 16 is provided for storing code, such as test code 30, from the code management storage 28. The storage 16 is controlled to ensure that only the version control shell 10 has access to the storage 16 and there is no direct access for a user, such as developer.

The interface 14 is also coupled to a code loader 18 for loading code into the controlled storage 16. The code loader 18 loads code into the controlled storage 16 on receipt of the command to execute the test code 30. The code loader 18 also retrieves program code 32 from the code management storage 28 and loads it into the controlled storage 16. In a preferred embodiment the code loader 18 retrieves all linked components from the code management storage 38 on execution of the code. However, the code loader 18 can retrieve each component from the code management storage 28 on execution of that component, with some detriment in the duration of an overall test cycle.

A processor 20 is also coupled to the interface 14 and to the controlled storage 16. The processor 20 executes the test code 30 and program code 32 in the controlled storage 16, once the code is loaded. The processor 20 initiates execution on receipt of a command from the user or a command embedded in the test code 30 or program code 32.

A logger 22 for logging results of the executing code may also be coupled to the controlled storage 16 and to the processor 20. The logger 22 logs results of the code in a log file 34 in the controlled storage 16.

A garbage collector 24 may be coupled to the processor 20 and to the controlled storage 16. The garbage collector 24 removes the test code 30 and program code 32 from the controlled storage 16, while leaving the logged results in the log file 34. The garbage collector 24 may remove all individual components after execution of the whole program code.

The version control shell 10 may further include a recorder 26. The recorder 26 may be provided for recording components associated with the test code 30 and program code 32. The recorder 26 may store references for the components for use in retrieving the components on subsequent execution of the test and program codes 30, 32. The components are retrieved in the same sequence in which they are used in the execution. The sequence may be associated with a user.

When the version control shell 10 is invoked, a new and uniquely identifiable directory is created in the temporary controlled storage 16. The unique directory created in the controlled storage 16 mirrors a directory in the code management storage 28. The unique directory created in the controlled storage 16 is maintained in the storage 16 for the lifetime of the shell 10, and is the destination for files as they are extracted from the code management storage 28 by the version control system 12.

The version control shell 10 is implemented by overriding the behavior of a path to the code management storage 28. The concept of a path, and the path variable itself, remain as is common in prior art shell systems.

In the invented version control system 12, the directory structure from root downwards is created within the temporary controlled storage 16. The unique directory created in the controlled storage 16 is presented to a user as if it were the original system directory structure.

Figure 2:
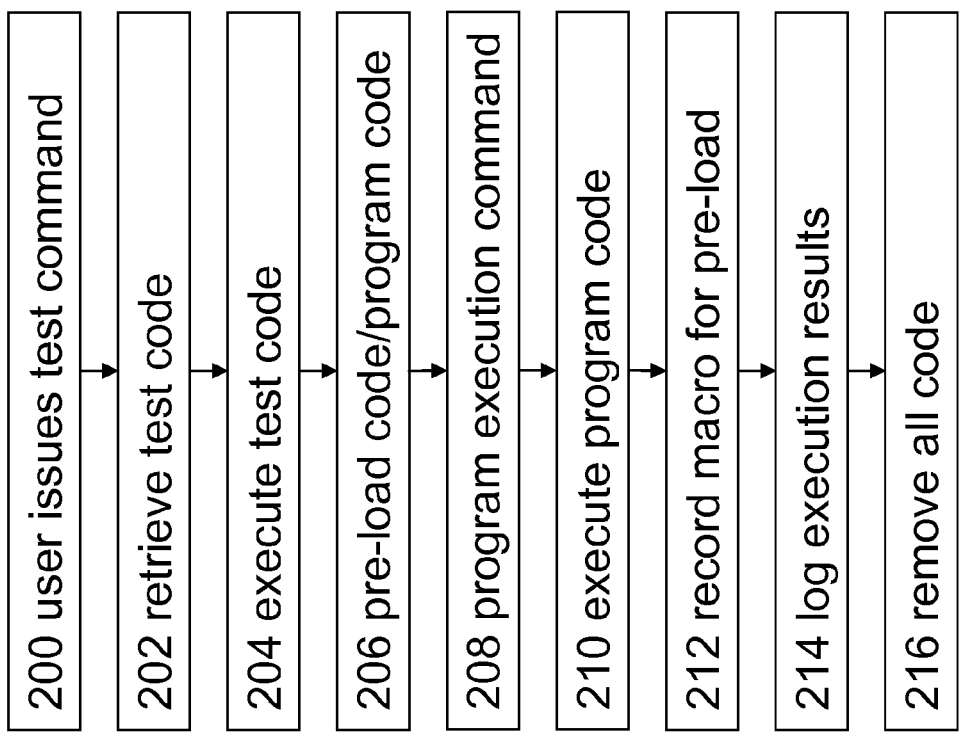
FIG. 2 is a flow chart of a preferred embodiment of method of the present invention.

Referring to the drawing Figures, and particularly to FIG. 2, a preferred embodiment of the invented method commences in process block 200, when a user issues a command to test code. The command may received by the interface 14 and may optionally include a date and time as a parameter. The version of code extracted from the code management system may be determined by the date and time specified. In the absence of a date and time parameter the default value is the current date and time.

In process block 202, test code 30 indicated by the command is retrieved from the code management storage 28 into the controlled storage 16. For example, the first test component 30A may be retrieved from code management storage 28 into controlled storage 16. The first test component 30A or subsequent test components, contain or may have links to, code for pre-loading a sequence of component references. The first test component 30A, or subsequent test components, also initiates execution of the first program component 32A.

The test code 30 is then executed, in process block 204, in the controlled storage 16. In process block 206, the test code 30 initiates pre-loading of all the associated program components. In a preferred embodiment of the method, the test and program components are pre-loaded in the sequence in which they are used in the test and program execution. Pre-loading of the test and program components may be performed in parallel with other executing steps of the method. Optionally, a request for a component for execution may take priority over the pre-loading of the components.

The method continues in process block 208, wherein a first program execution command is located in the test code 30. Once the first program component 32A has been loaded then it may be executed, as shown in process block 210, in parallel with the test code 30 by the processor 20 in the controlled storage 16. The execution starts with the first program component 32A.

In process block 212, if there is no pre-load code associated with the test code command and then a pre-load macro code may be recorded by the recorder 26. The pre-load macro may be generated by storing a sequence of pre-load commands in code in the first test component 30, and possibly subsequent test components, in the sequence that the test code 30 and program code 32 load components are executed. The sequence of pre-load commands of the pre-load macro may be linked the first test component, or subsequent test component. Further, each pre-load command may reference a component. The sequence of components may be associated with the test command and with a user, for example.

The results of the executing test and program code are logged, in process block 214, by the logger 22 in the log file 34. When the test code 30 and program code 32 have finished executing, the garbage collector 24 removes all the code from the controlled storage 16, as shown in process block 216, while leaving the results in the log file 34. All the individual components are removed after execution of the whole program code.

Referring still to the drawing Figures, an example of use of an embodiment of the invented method will now be described with respect to a example program code and test code. Program component 32A prompts a user for an input string. The input string is then passed to program component 32B. Program component 32B then prints the input string.

Test component 30A initiates a pre-load macro to load all the test and program components 30B, 32A, 32B. Test component 30A initiates program component 32A, waits for a prompt from program component 32A, supplies a string, and passes control to test component 30B. Test component 30B checks the string output of program component 32B with the supplied string and logs a correct operation in the log file 34 if they match.

A user issues a command to execute test code 30. Test component 30A is retrieved from code management storage 28 into controlled storage 16. The test component 30A is executed in the controlled storage 16 and initiates pre-load code to pre-load all the test and program components 30B, 32A, 32B in the sequence in which they are used in the test and program execution i.e. 32A, 30B, 32B. Test component 30A initiates the program component 32A and waits for a prompt from program component 32A to supply a string. On prompting, test component 30A supplies a string and passes control to test component 30B.

The program component 32A is retrieved, or pre-loaded, from the code management storage 28 into the controlled storage 16. The program component 32A is then executed, by the processor 20, in the controlled storage 16. Program component 32B prompts a user for an input string. In the example shown, there is no test user, but an executing test code, that supplies a test string. Program component 32A receives the test string and passes it to program component 32B. Program component 32B prints the input string.

The test component 30B then checks the string output of program 32B with the supplied string and logs a correct operation in the log file 34. When the test code 30 and program code 32 have finished executing, the garbage collector 24 removes all the code (30A, 30B, 32A, 32B) from the controlled storage 16 while leaving the results in the log file 34. All the individual components are removed after execution of the whole program code.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system for controlling code in a code management system comprising:
   an interface for receiving a command to execute code;
   controlled storage for storing the code loaded from the code management system;
   a processor for executing the code in the controlled storage;
   a logger for logging results of the code;
   a garbage collector for removing the code from the controlled storage after execution of the code; and
   a recorder for recording a list of associated code components as each code component is loaded into the controlled storage, such that linked components may be pre-loaded into the controlled storage on subsequent execution of the code.

2. The system of claim 1 wherein the code comprises test code and program code.

3. The system of claim 2 wherein the test code comprises a first test component linking to at least one other test component, and wherein one of the test components comprises a command to execute the program code.

4. The system of claim 2 wherein the program code comprises a first program component linking to at least one other program component.

5. The system of claim 1 further comprising a code loader for loading code into the controlled storage.

6. The system of claim 5 wherein the code loader retrieves each component from code management storage on execution of that component.

7. The system of claim 1 wherein the garbage collector removes individual code components from the controlled storage after execution of the code and the logged results remain in the controlled storage.

8. The system of claim 1, wherein further the code components are pre-loaded into the controlled storage in a sequence in which they are used in code execution.

9. The system of claim 8 further comprising associating the sequence with a selected one of a user and a test command.

10. A method for controlling code in a code management system comprising:
    receiving from a command to execute code;
    retrieving the code from code management storage and reloading at least a portion of the code into controlled storage in a sequence in which they are used in code execution;
    executing the code in the controlled storage;
    logging results of the executing code; and
    removing the code from the controlled storage upon execution of the code.

11. The method of claim 10 wherein the code comprises test code and program code.

12. The method of claim 11 further comprising:
    receiving from the test code a command to execute program code;
    retrieving test code and program code from the code management storage and loading the test code and program code into the controlled storage;
    executing the test code and the program code in the controlled storage; and
    removing both the program code and test code from the controlled storage.

13. The method of claim 12 further comprising:
    the test code comprising a first test component linking to at least one other test component, one of the test components executing the program code; and
    the program code comprising a first program component linking to at least one other program component.

14. The method of claim 13 further comprising retrieving each component from code management storage on execution of that component.

15. The method of claim 13 wherein the individual components are removed after execution of the code and the logged results remain in the controlled storage.

16. The method of claim 13 further comprising:
    recording a list of components associated with the code and storing the list for use in preloading the components on subsequent execution of the code.

17. The method of claim 16 further comprising retrieving the components in the sequence in which they are used.

18. The method of claim 17 further comprising associating the sequence with a user.

19. A system for controlling code in a code management system comprising:
    an interface for receiving a command from a user to execute code;
    controlled storage for temporarily storing the code from the code management system, wherein components of the code are pre-loaded into the controlled storage in a sequence in which they are used in code execution;
    a processor for executing the code in the controlled storage;
    a logger for logging results of the code in the controlled storage; and
    a garbage collector for removing the code from the controlled storage after execution of the code while leaving the logged results in the controlled storage.

* * * * *